United States Patent [19]
Blinow et al.

[11] 3,752,051
[45] Aug. 14, 1973

[54] FILM ADVANCE ACTUATED LATCH FOR REFLECTING MEMBER

[75] Inventors: Igor Blinow, Millis; Robert D. Leduc, Marlboro, both of Mass.

[73] Assignee: Polaroid Corporation, Cambridge, Mass.

[22] Filed: Apr. 24, 1972

[21] Appl. No.: 247,047

[52] U.S. Cl. ........................................ 95/42, 95/13
[51] Int. Cl. ........................................... G03b 19/12
[58] Field of Search ............................ 95/42, 13

[56] References Cited
UNITED STATES PATENTS

| | | | |
|---|---|---|---|
| 3,304,848 | 2/1967 | Steisslinger et al. | 95/42 |
| 3,319,551 | 5/1967 | Ettischer et al. | 95/42 |
| 3,623,410 | 11/1971 | Mita | 95/42 |
| 3,640,202 | 2/1972 | Nomura | 95/42 |
| 3,653,313 | 4/1972 | Leduc | 95/42 |

Primary Examiner—Samuel S. Matthews
Assistant Examiner—E. M. Bero
Attorney—Alfred E. Corrigan

[57] ABSTRACT

Photographic apparatus of the reflex type having a reflecting member pivotally mounted for movement between viewing and exposure positions and a latch mounted in the path of travel of the reflecting member for releasably retaining the reflecting member in the viewing position. The apparatus is provided with a film-advancing system for (1) moving an exposed photosensitive element out of its exposure position and (2) maintaining the latch in an inoperative position during movement of the reflecting member into the viewing position.

8 Claims, 4 Drawing Figures

FILM ADVANCE ACTUATED LATCH FOR REFLECTING MEMBER

BACKGROUND OF THE INVENTION

1. Field of the Invention

This invention relates to photographic apparatus of the reflex type.

2. Description of the Prior Art

There has been described cameras of the single lens reflex type having a reflecting member pivotally mounted for movement between a first position in which the reflecting member is located in lighttight relation with a photosensitive element located in position for exposure and is a component of the camera's viewing system, and a second position wherein the reflecting member is a component of the camera's exposure system, e.g., see U.S. Pat. Nos. 3,643,565 and 3,641,889. Generally, the camera's shutter is open when the reflecting member is in the first or viewing position and some means, e.g., a latching system, is usually provided for preventing the accidental movement of the reflecting member out of its lighttight relationship with the photosensitive element located in position for exposure. Present latching systems usually include a latch mounted for movement between an operative position wherein it precludes movement of the reflecting member toward the second or exposure position, and an inoperative position wherein the latch is ineffective to maintain the reflecting member in the first position. Movement of the latch between its operative and inoperative positions is usually synchronized with the movement of the reflecting member between its viewing and exposure positions and accordingly it is important that the latch be held in its inoperative position during the time that the reflecting member is moving from the viewing position to the exposure position and then back to the viewing position. This holding feature may be accomplished by coupling the latching system with a source of energy, e.g., a battery as disclosed in U.S. Pat. No. 3,641,889, wherein the latch is electromagnetically controlled or, alternatively, additional structure may be added to the latching system for mechanically holding the latch in the inoperative position during movement of the reflecting member. Obviously, each of the above proposals has its inherent drawbacks. In the first proposal there is a continuous drain on the battery during the period of time that the reflecting member is in motion, while adoption of the latter proposal will add to the existing complexity and overall cost of manufacture of the camera.

SUMMARY OF THE INVENTION

The invention relates to photographic apparatus of the reflex type and, more particularly, to a single lens reflex camera having a reflecting member pivotally mounted for movement between a first position wherein it is located in lighttight relation with a photosensitive element located in position for exposure, and a second position wherein it uncovers the photosensitive element to enable exposure of the latter. The optics of the camera are such that the reflecting member is a component of the camera's viewing and/or focusing system when located in the first position and, when located in the second position, is a component of the camera's exposure system. Normally the reflecting member is located in the first position and the camera's shutter is open to permit through the lens viewing and-/or focusing of the subject to be photographed. Should the camera be sharply jostled when the reflecting member is in the first position and the shutter is open, it may result in the reflecting member being temporarily moved out of its lighttight relationship with the photosensitive element thereby subjecting the latter to possible premature exposure to the ambient light. To obviate this possibility a latching system is provided for releasably retaining the reflecting member in the first position. The latching system includes a latch and an actuator spring biased into engagement with a rotatable cam for moving the latch between an operative position wherein the latch is located in overlying relation with a portion of the reflecting member and an inoperative position wherein the latch does not interfere with the movement of the reflecting member out of or into the first position. The aforementioned cam is an integral part of one of the gears of the camera's power train and, due to design considerations, e.g., gear ratios and direction of rotation, is effective to move the latch out of the latching or operative position and back into the operative position four times for each exposure cycle of the camera. It is only the first movement of the latch to the inoperative or unlatched position and the final movement of the latch into the latched or operative position which are operationally important. Since actuations of the latch other than the aforementioned first and last movements have no useful function, add to the wear of the latch and actuator, and represent a needless load on the power train and its source of energy, it is desirable that they be eliminated. This is accomplished by locating the camera's film-advancing apparatus relative to the actuator such that the terminal movement of the film-advancing apparatus in a direction to advance an exposed photosensitive element out of its exposure position is used to move the actuator, against its spring bias, out of engagement with the rotating cam (the cam having previously moved the latch into the inoperative position) thereby removing the actuator from the control of the cam and maintaining the latch in the inoperative position. The film-advancing apparatus is in turn maintained in said terminal position by a detent until the reflecting member returns to the first position. After the reflecting member returns to the first position, the detent is moved to release the film advancing apparatus for return to its original position, the latch actuator moves back into engagement with the cam while simultaneously moving the latch into its operative or latching position, and the exposure cycle of the camera terminated by disconnecting the power train from its source of energy.

An object of the invention is to provide a control over a latching system for a pivotally mounted reflecting member whereby actuation of the latching system is held to a minimum.

Another object of the invention is to correlate the movement of film-advancing apparatus with that of a latching system for a reflecting member whereby actuations of the latching systems are held to a minumum.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
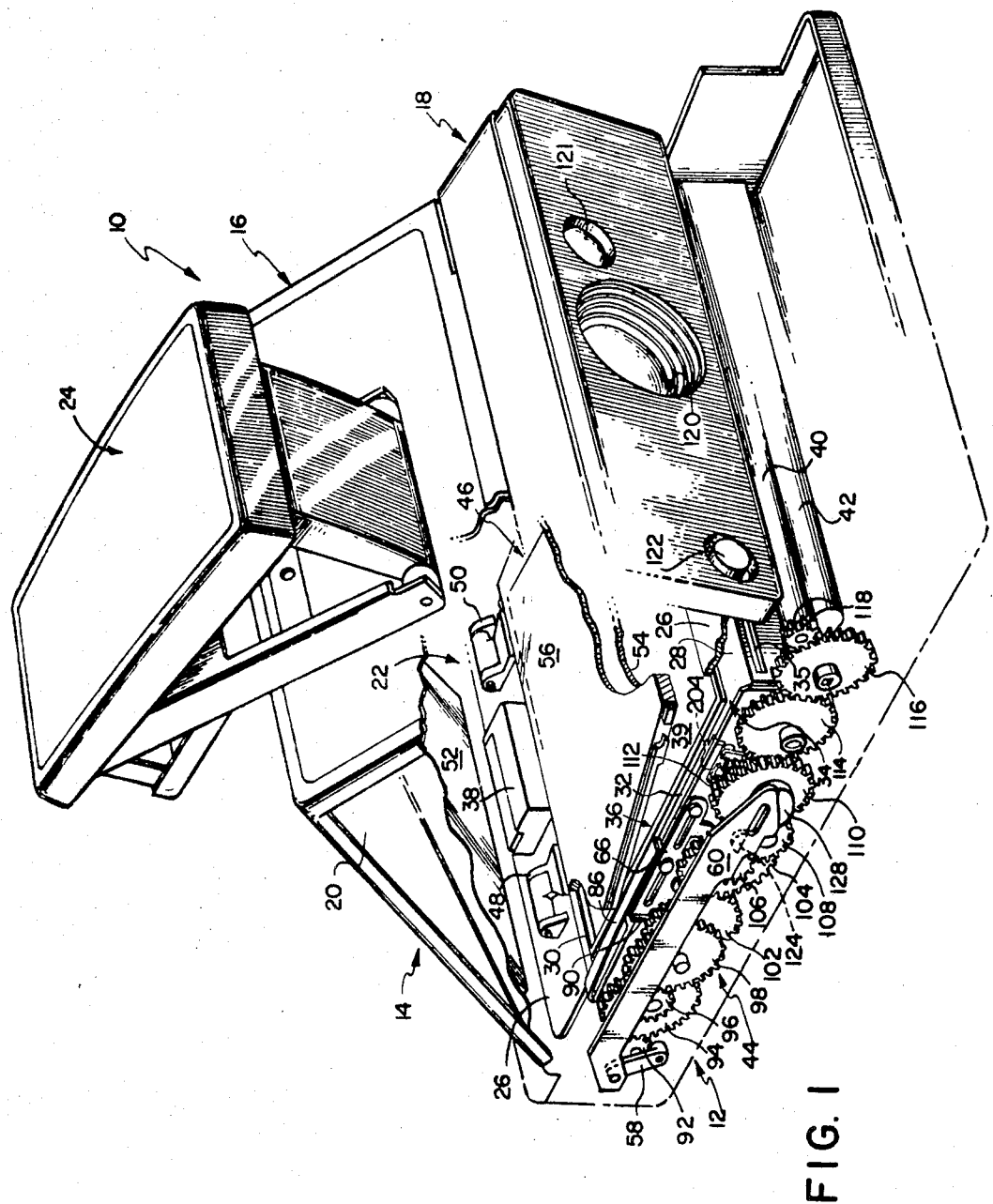
FIG. 1 is a perspective view, partly in section, of a folding type self-developing camera of the single lens reflex type which incorporates the instant invention.

Reference is now made to FIG. 1 of the drawings wherein is shown a foldable camera 10 of the self-developing, single-lens reflex type similar to that shown in the copending application of P. Costa et al., entitled, "Folding Camera," Ser. No. 141,554, filed on May 10, 1971, and assigned to the same assigned as the instant application. Although the invention is described in conjunction with a folding camera, it should be noted that the invention applies equally as well to cameras of the non-folding type. As more fully described in the aforementioned application, camera 10 includes a plurality of housing sections 12, 14, 16 and 18 which cooperate with a flexible opaque bellows 20 to define sides of an exposure chamber 22. Housing sections 12, 14, 16 and 18 are pivotally coupled for movement, along with a collapsible viewfinder 24, from the operative extended position shown in FIG. 1 to a folded or collapsed position wherein the camera 10 assumes a slim, compact configuration which readily lends itself to carriage in the pocket of the user.

Housing section 12 includes a generally rectangular shaped member 26 having a rectangular shaped opening 28 therein. Opening 28 is adapted to receive one side of an upstanding rib 30 located on the forward wall 32 of a film cassette 34 for properly positioning the foremost film unit located within the cassette in position for exposure to light transmitted through cassette exposure opening 36. A spring wound or battery driven motor 38 is located near one end of opening 28 and a pair of rollers 40 and 42 having suitable means for resiliently biasing the rollers toward each other is mounted adjacent an opposite end of opening 28. Motion-transmitting means in the form of a gear train 44 extends along one side of member 26 and is coupled between the motor 38 and roller 40 for driving the latter in a counterclockwise manner (as viewed in FIG. 1) to transport a film unit engaged between the rollers toward the exterior of the camera.

Camera 10 is provided with a reflecting member 46 pivotally attached to rectangular shaped member 28 at lugs 48 and 50 for movement between a first viewing position wherein it cooperates with member 28 to define a lighttight seal therebetween for preventing exposure of the foremost film unit in cassette 34, and a second exposure position wherein it lies closely adjacent a mirror 52 mounted on an interior surface of housing section 14. The reflecting member 46 includes a support (not shown) having a mirror or similarly specularly reflecting surface 54 on one side thereof and a viewing surface 56 on the other side configured to have a texture and optical design to facilitate focusing of the image. Reflecting member 46 is spring loaded to the up or exposure position and is provided with a linkage system including a crank 58 and ram 60 for moving the reflecting member 46 to the down or viewing and focusing position.

Figure 4:
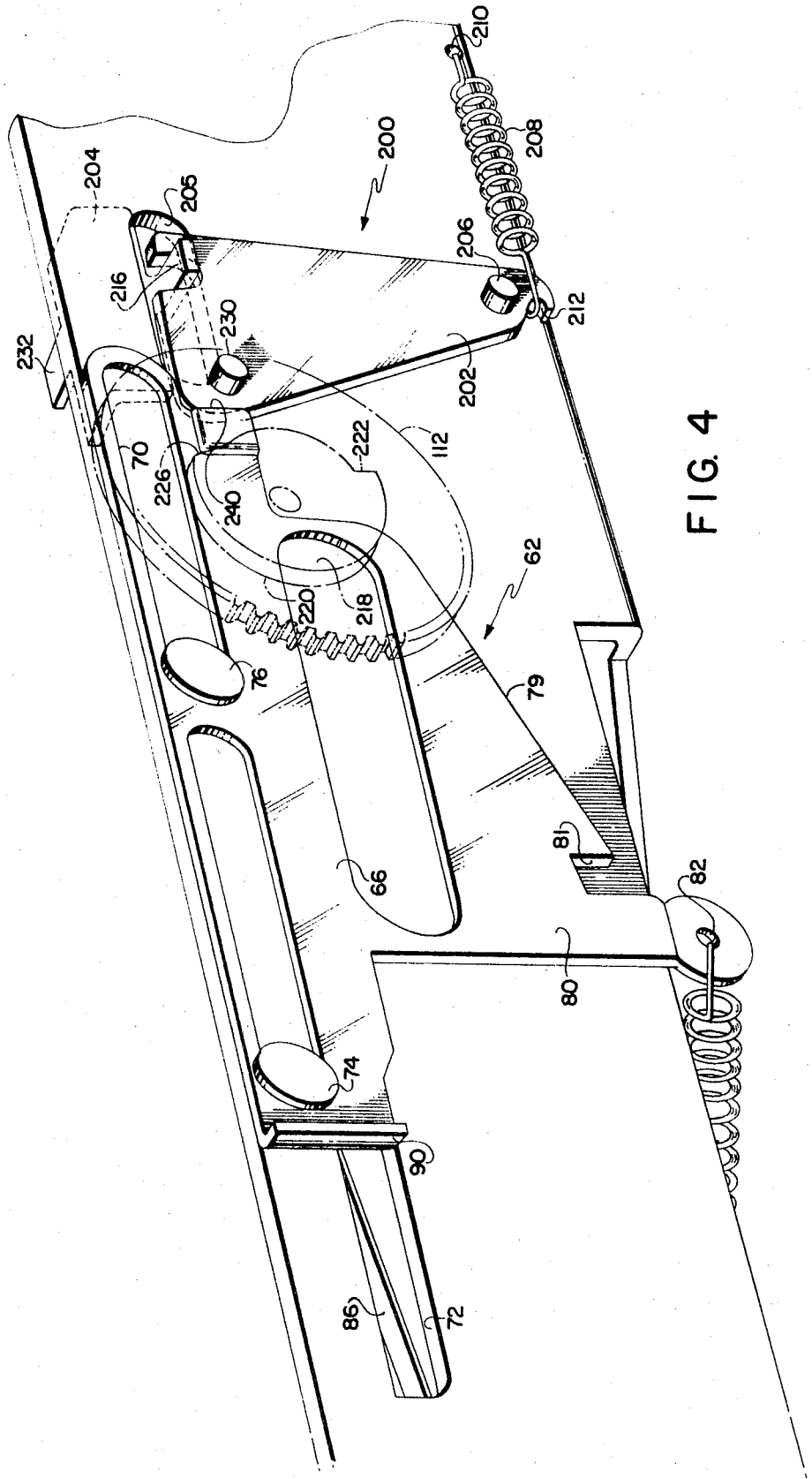
FIG. 4 is a view similar to FIG. 3 showing the latching means in an inoperative position.

The film-advancing apparatus of the camera includes a generally T-shaped member 62 (see FIG. 2) mounted on a flange 64 for reciprocating motion, i.e., toward and away from the rollers 40 and 42. T-shaped member 62 includes a main body portion 66 having elongated slots 68 and 70 therein which are adapted to slideably receive pins 74 and 76 mounted on flange 64. Pins 74 and 76 have enlarged end portions for retaining T-shaped member 62. Member 62 further includes a leg 80 having a hole 82 therein for receiving one end of a spring 84. Spring 84 has its other end connected to flange 64 for resiliently biasing T-shaped member 62 toward the left, i.e., away from the rollers 40 and 42. A resilient arm 86 extends from T-shaped member 62 in cantilever fashion and through an elongated slot 72 in flange 64. The resilient arm 86 includes a downwardly turned film-engaging member 88 which is adapted to enter an elongated opening 31 in cassette 34 and engage the trailing end of a film unit 39 prior to moving it out of the cassette 34 via exit 35 and into the bite of rollers 40 and 42. Member 88 is configured such that its free end does not extend to a position wherein it could engage the trailing end of more than one film unit. Also extending from T-shaped member 62 is a flange 90 which is adapted to be engaged by means to be described later for moving the film-advancing apparatus from the position shown in FIG. 2 to a second position, as shown in FIG. 4, wherein the film unit is advanced into engagement with the rollers 40 and 42.

Returning briefly to the gear train 44, it can be seen that it includes a plurality of gears 92 – 116. The gear train includes two power paths, i.e., one which couples the gear 118 located on one end of roller 40 with drive gear 92 and a second path which interconnects drive gear 92 with a timing gear 110. The first path includes drive gear 92 (which is coupled to the motor 38), idler gears 94, 98, 102, 104, 112, 114 and 116, reduction gears 96 and 100, integral with gears 94 and 98, respectively, and roll drive gear 118. The second path includes drive gear 92, idler gears 94, 98, 102, 104 and 108, reduction gears 96, 100, 106, and timing gear 110. Obviously timing gear 110 rotates completely independent of idler gear 112 and reduction gear 106 is integral with idler gear 104.

Figure 3:
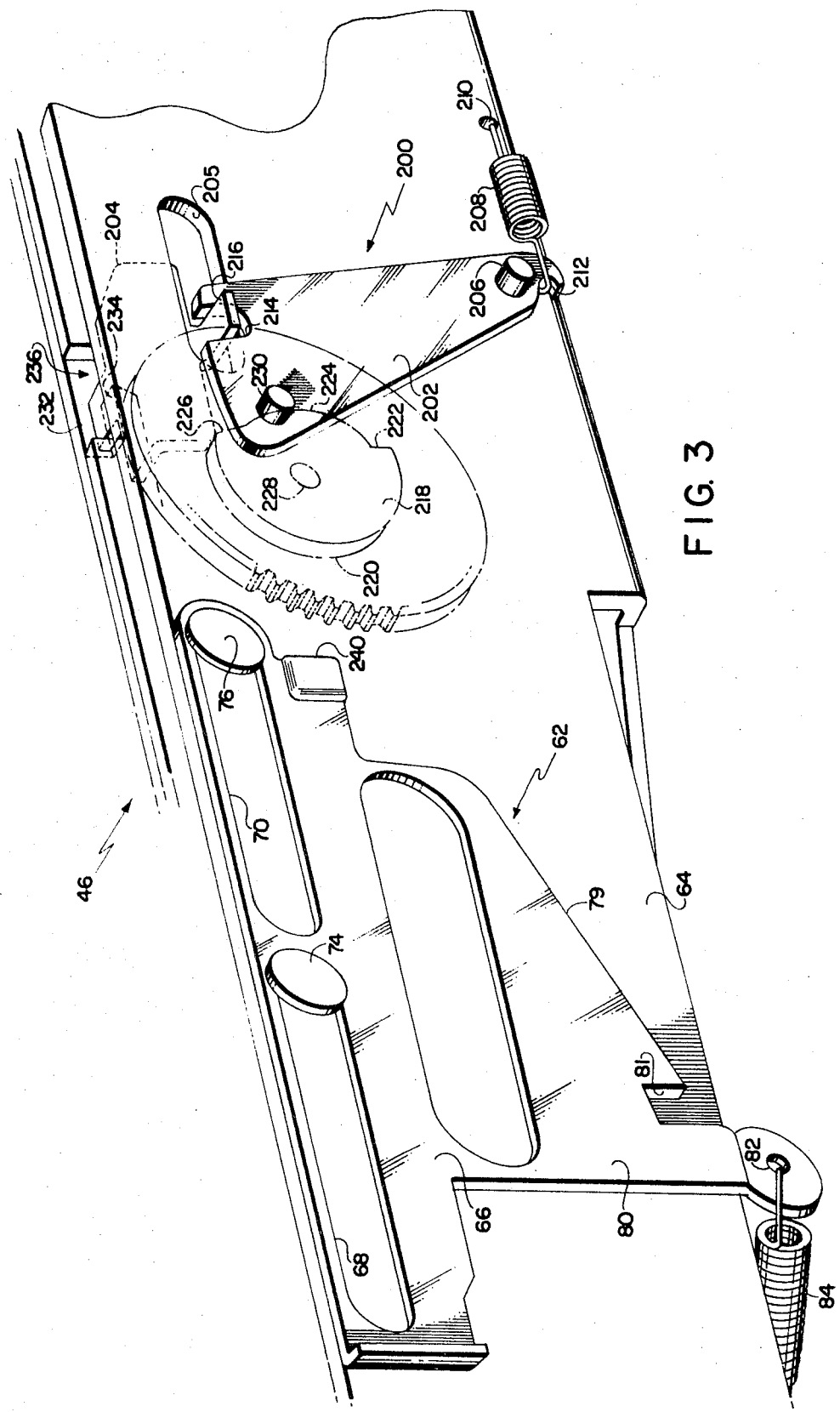
FIG. 3 is an enlarged perspective view of a latching means for the camera's reflecting member, the latching means being shown in an operative position.

A latching system 200 is provided for releasably maintaining the reflecting member 46 in lighttight relation with the uppermost photosensitive element in cassette 34, i.e., it releasably maintains the reflecting member 46 in the first or viewing position Specifically, the latching system 200 includes latching means in the form of an actuator 202 and a Z-shaped latch 204. Actuator 202 is pivotally mounted on flange 64 by a pin 206 and is resiliently biased in a counterclockwise direction by a spring 208 having one end attached to flange 64 at 210 and its other end engaged in a recess 212 in actuator 202. A second recess 214 is provided in actuator 202 for receiving one end 216 of latch 204, said end 216 extending through a slot 205 in flange 64. The latching system also includes means for moving the latching means 202 and 204 from its operative position, as shown in FIG. 3, to its inoperative position, as shown in FIG. 4. The latter means include a cam 218 formed in the inwardly facing surface of gear 112. Cam 218 is configured having a high dwell portion 220, a rapid drop off portion 222, a low dwell portion 224 and a rapid rise portion 226. Cam 218 and gear 112 are adapted for clockwise rotation about their axis 228 for moving latch 204 between its operative or latched position and its unlatched or inoperative position. A cam follower 230 is mounted on actuator 202 for transferring motion from the cam 218 to the actuator 202 and latch 204.

As best seen in FIG. 3, latch 204, which is supported for reciprocal movement by means not shown, includes a portion 232 which is adapted to overlie a land 234 formed in one lateral side of reflecting member 42 (see also FIG. 1) to prevent inadvertent displacement of the reflecting member during the period of time that the camera's shutter is open and the reflecting member is in the viewing position. Also formed in reflecting member 46 is a recess 236 which extends between each side of the reflecting member and provides a passageway through which end 323 of latch 204 can move relative to the passageway when end 232 is located in alignment with the passageway or recess 236. In other words, when the latch 204 is in the operative position, engagement between end 232 and land 234 prevents movement of the reflecting member 46 out of the down or viewing position and, when the latch is in the inoperative position, end 232 is in alignment with recess 236 and is incapable of preventing movement of the reflecting member out of the viewing position. For a more detailed description of the latching system, reference is made to the copending application of Igor Blinow, Ser. No. 222,964, filed Feb. 2, 1972, and assigned in common herewith.

During the focusing mode of operation, reflecting member 46 is in the down position closely adjacent the film container 34; the camera's shutter and lens assembly 120 is open to allow the entry of light into chamber 22; and the gear train 44, the ram 60 and crank 58, and the latching system 200, assume positions substantially as shown in FIGS. 1 and 3. After the image has been properly focused on viewing surface 56, as seen through viewfinder 24, the camera's control button 122 is depressed to initiate operation of the camera's control program as more fully described in the commonly assigned copending applications of Edwin H Land et al., Ser. No. 134,733 filed Apr. 16, 1971, and entitled, "Reflex camera," and Edwin K Shenk, Ser. No. 134,725, filed Apr. 16, 1971, and entitled, "Reflex Camera With Motor Drive."

Figure 2:
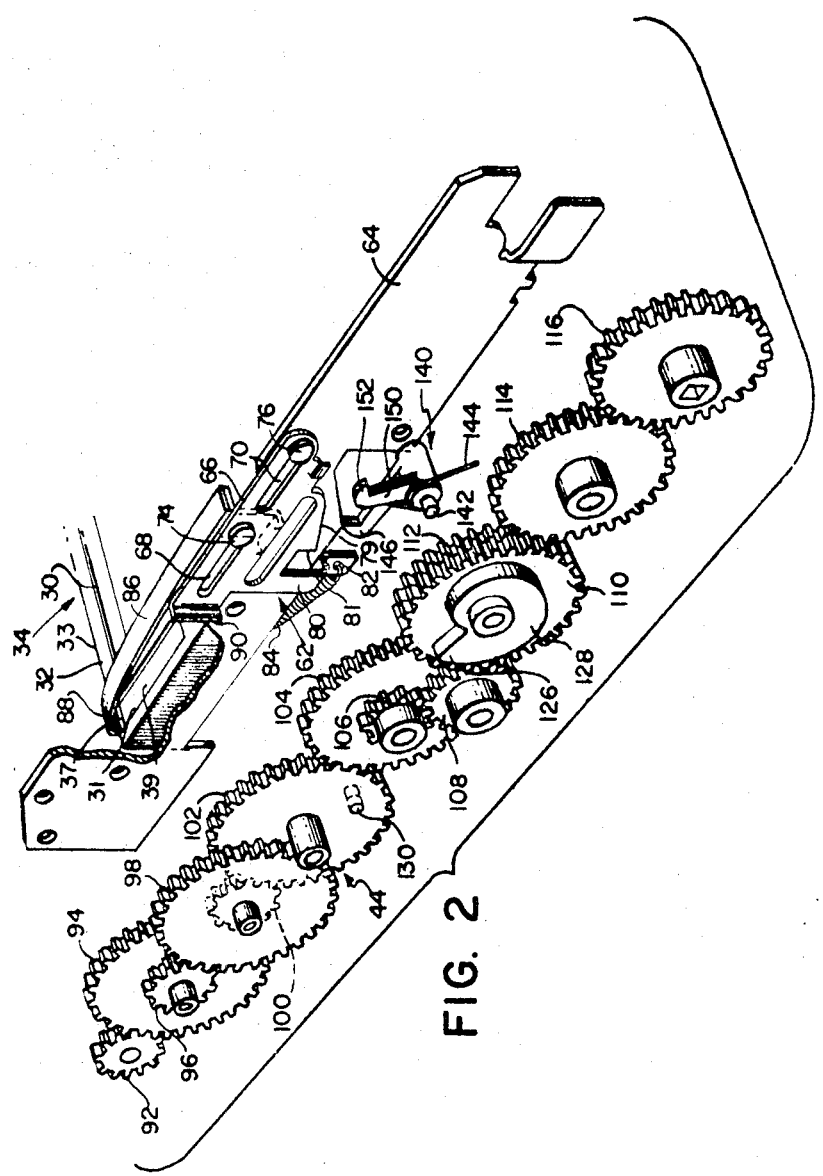
FIG. 2 is an enlarged, exploded perspective view of certain components of the camera.

Initiation of the control program fully closes the shutter 120 and closes the circuit to motor 38. Motor 38 drives the gear train 44 for a period of time sufficient to rotate a point on timing gear 110 counterclockwise through an angle of approximately ten degrees. As more fully described in the aforementioned Blinow application, gear 112 rotates through approximately four revolutions for each one revolution of timing gear 110. Accordingly, rotation of gear 110 through ten degrees is effective to rotate gear 112 through approximately forty degrees thereby moving the rapid rise portion 226 of cam 218 into engagement with cam follower 230 to pivot actuator 202 and latch 204 out of their operative positions shown in FIG. 3 and into an inoperative position wherein end 232 of latch 204 is in alignment with recess 236. Reflecting member 46 may now be pivoted out of the viewing position and into an exposure position. As noted previously, reflecting member 46 is spring biased toward the up position. However, reflecting member 46 is prevented from moving to the up position because of its connection with link 58 and ram 60. Ram 60 (See FIG. 1) has a cam follower 124 mounted on one side thereof which is initially in engagement with the high point 126 of a cam 128 fixedly mounted on timing gear 110, when the image is being focused. Rotation of timing gear 110 in a counterclockwise direction moves the high point 126 of cam 128 to a position allowing the ram 60, which is being urged to the right by the reflecting member up springs, to move to the right as the reflecting member pivots to the up or exposure position wherein it is located closely adjacent mirror 52. The shutter 120 is then opened and image-producing light is directed along an optical path and reflected by mirror 54 toward cassette 34 to expose the foremost film unit, i.e, the one closest to wall 32 of cassette 34. A photocell 121 provides an input to the control system for closing the shutter when the correct exposure time has elapsed. After the shutter has been closed, the motor 38 is automatically started again to drive the gear train 34. This second starting of the motor 38 rotates gear 102 and pin 130, which extends from gear 102 inwardly toward frame member 64, in a clockwise direction. During this rotation, pin 130 revolves into a position wherein it engages flange 90 and moves the film-advancing apparatus including film-engaging section 88 to the right (as viewed in FIG. 1) to move the exposed film unit into the bite of the rotating rollers 40 and 42. As best seen in FIG. 2, film cassette 34 has an elongated opening 31 in forward wall 32 which extends part way down the trailing end wall 33 of the cassette. Opening 31 allows film-engaging section 88 to extend into the cassette to a position just rearwardly of the trailing end 37 of a film unit 39 in preparation for moving the film unit through exit 35 (see FIG. 1) in cassette 34 and into the bite of rollers 40 and 42.

Rollers 40 and 42 apply compressive pressure to a container 45 of processing liquid located near the leading edge of the film unit to rupture the container and spread the contents thereof between the photosensitive and image-receiving elements of the film unit to initiate a diffusion transfer process of the type described in U.S. Pat. No. 3,415,644. After the processing liquid has been spread, rollers 40 and 42 transport the film unit to the operator of the camera in a condition which does not require any other mechanical processing. Shortly after the processing liquid has been spread between elements of the film unit, the high point 126 on cam 128 rotates to a position in which it now drives cam follower 224 and ram 60 to the left, thereby driving reflecting member 46 to the down position. The shutter 120 now is allowed to assume an open condition and the circuit to the motor 38 opened to complete the cycle.

The gear ratio between the various gears in gear train 44 is such that gear 102 must rotate through more than one revolution in order for the rollers 40 and 42 to be driven a sufficient period of time to move the exposed film unit out of engagement with the rollers. For that reason, a disenabling means in the form of a latch 140 is provided for holding T-shaped member 62 in the second position, i.e., to the right as seen in FIG. 4, for a period of time at least sufficient to enable the exposed film unit to move out of engagement with the rollers 40 and 42. By thus holding T-shaped member 62 in the second position, flange 90 is maintained in a position which precludes repeated engagement by pin 130 during subsequent revolutions of gear 102 and the resulting actuation of the film-engaging member 88 to move another film unit out of the cassette 34 before the film unit has been exposed. Latch 140 is pivotally coupled to flange 64 by a pin 142 and is resiliently biased in a clockwise direction by any suitable means such as spring 144. Latch 140 includes a detent 146 which is adapted to be cammed downwardly against its spring bias by inclined surface 79 of T-shaped member 62 as the latter moves toward the right. When T-shaped member 62 reaches its second position, i.e., the film unit is now in the bite of the rollers 40 and 42 and the T-shaped member is in the position shown in FIG. 4, detent 146 is urged by spring 144 in a clockwise direction into a recess 81 in T-shaped member 62 to releasably retain the latter against movement to the left under the influence of spring 84. A release member including an arm 150 having a cam follower 152 at its end extends from latch 140 and is adapted to be engaged by a peripheral surface of cam 128 for rotating latch 140 in a counterclockwise direction to move detent 146 out of recess 81, thereby allowing T-shaped member 62 to return to its first or starting position (see FIG. 1) under the influence of spring 84. Accordingly, cam 128 functions to drive reflecting member 46 to the down or viewing position and as an enabling means for permitting the film-advancing apparatus to return to the position shown in FIG. 1. Movement of the ram towards the position shown in FIG. 1 is effective to disconnect the motor from its source of energy, e.g., a battery located in cassette 34, and the exposure cycle is terminated with the reflecting member 46 located in the viewing position, the shutter 120 open, the latch 204 located in the operative or latched position and the film-advancing apparatus in the position shown in FIG. 1.

As mentioned above, gear 112 is also rotated through a plurality of revolutions, i.e., four, for one revolution of timing gear 110, thereby possibly resulting in latch 204 and actuator 202 being reciprocated four times during each exposure cycle. However, by judicially constructing and arranging the film-advancing apparatus 62 the otherwise needless or non-functional actuations of the latching means 202 and 204 are eliminated, thereby reducing the wear on the latching means and the load on the camera's source of energy while simultaneously reducing any objectionable noises caused by the actuator repeatedly falling back onto the rapid drop off portion 222 of cam 218. Specifically, the film-advancing apparatus includes an extension 240 which, as the film-advancing apparatus approaches the end of its travel to the right, engages the actuator (the actuator having previously been moved into an inoperative or unlatched position) and rotates it in a clockwise manner to move cam follower 230 out of engagement with cam 218. The extension maintains the actuator 202 and latch 204 in their inoperative positions and out of the control of the cam 218 and spring 208 until the film-advancing apparatus has been released for movement to the left, thereby allowing the latching means to return to the operative position as the camera's exposure cycle is about to terminate. Accordingly, it may be seen that actuations of the latching means 202 and 204 are held to a minimum, i.e., the latching means is moved into the inoperative position by initial rotation of gear 112 and cam 218 and is moved back into the operative position by spring 208 only after the film-advancing apparatus including its extension 240 has been released for movement back to its original position as shown in FIG. 1.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus of the reflex type comprising:
   reflecting means mounted within said photographic apparatus for movement between first and second positions;
   latching means mounted adjacent said reflecting means, said latching means being adapted for movement between an operative position wherein said reflecting means is retained in said first position and an inoperative position wherein said latching means is ineffective to prevent movement of said reflecting means from said first position to said second position;
   means for moving said latching means from said operative position to said inoperative position prior to said reflecting means moving from said first position to said second position;
   means for maintaining said latching means in said inoperative position and out of engagement with said moving means until said reflecting means has moved from said second position to said first position;
   means operative subsequent to said reflecting means moving into said first position for rendering said maintaining means ineffective to maintain said latching means in said inoperative position and out of engagement with said moving means; and
   means for returning said latching means to said operative position after said maintaining means have been rendered ineffective to maintain said latching means in said inoperative position; whereby said latching means is in said operative position only when said reflecting means is in said first position.

2. Photographic apparatus as defined in claim 1 wherein said reflecting means is a component of a viewing system when located in said first position.

3. Photographic apparatus as defined in claim 2 wherein said latch means retains said reflecting means in lighttight relation with a photosensitive element when said reflecting means is in said first position.

4. Photographic apparatus as defined in claim 3 wherein said means for maintaining said latching means in said inoperative position includes film-advancing means mounted for movement into engagement with said latching means during the advancement of an exposed photosensitive element for maintaining said latching means into said inoperative position.

5. Photographic apparatus of the reflex type comprising:
   reflecting means mounted for movement between first and second position;

latching means mounted adjacent said reflecting means for movement between an operative position in which it maintains said reflecting means in said first position and an inoperative position in which said latching means is ineffective to prevent movement of said reflecting means toward said second position;

means for moving said latching means into said inoperative position prior to said reflecting means moving toward said second position;

biasing means for continuously urging said latching means toward said operative position;

film-advancing means actuatable to advance an exposed photosensitive element from an exposure position and to releasably retain said latching means in said inoperative position against the force of said biasing means until said reflecting means is moved back into said first position; and means for rendering said film-advancing means ineffective to retain said latching means in said inoperative position.

6. Photographic apparatus as defined in claim 5 wherein said reflecting means is a component of a viewing system when located in said first position.

7. Photographic apparatus as defined in claim 6 wherein said latching means retains said reflecting means in lighttight relation with a photosensitive element When said reflecting means is in said first position.

8. Photographic apparatus of the reflex type comprising:

reflecting means mounted for movement between first and second positions;

latching means mounted adjacent said reflecting means for movement between an operative position in which it maintains said reflecting means in said first position and an inoperative position in which said latching means is ineffective to prevent movement of said reflecting means toward said second position;

means including a cam for engaging and moving said latching means into said inoperative position prior to said reflecting means moving toward said second position;

biasing means for returning said latching means to said operative position;

film-advancing means actuatable to advance an exposed photosensitive element from an exposure position and to move said latching means out of engagement with said cam and releasably retain said latching means in said inoperative position against the force of said biasing means until said reflecting means is moved back into said first position; and means for rendering said film-advancing means ineffective to retain said latching means in said inoperative position.

* * * * *